July 28, 1953 D. E. CROOKER Re. 23,689

NONSKID RUBBER TRACTION MEMBER

Original Filed Oct. 1, 1948

INVENTOR.
David E. Crooker
BY
Morsell & Morsell
ATTORNEYS.

Reissued July 28, 1953 Re. 23,689

UNITED STATES PATENT OFFICE 23,689

NONSKID RUBBER TRACTION MEMBER

David E. Crooker, Ontonagon, Mich., assignor of one-half to Lloyd L. Felker, Marshfield, Wis.

Original No. 2,540,044, dated January 30, 1951, Serial No. 52,199, October 1, 1948. Application for reissue November 26, 1952, Serial No. 322,840

7 Claims. (Cl. 152—211)

Matter enclosed in heavy brackets [ ] appears in the original patent but forms no part of this reissue specification; matter printed in italics indicates the additions made by reissue.

This invention relates to improvements in non-skid rubber traction members, and more particularly but not exclusively to vehicle tires.

In the development of non-skid automobile tires, one of the types found to give favorable results is that shown in my prior application, Serial No. 9,276, filed on February 18, 1948, *now abandoned*, wherein are disclosed coils of wire having an irregular cross sectional shape molded longitudinally into the rider strips thereof.

In a tire of the type above referred to the road gripping action of the coils of wire is restricted to the substantially straight path which each coil traverses in the road bed over which the tire runs. This is obviously a relatively small percentage of the total area of the road bed contacted by the tire as it travels thereover.

It is therefore a general object of the invention to provide a non-skid tire tread having substantially uniform road gripping qualities over the entire road contacting surface area thereof.

A further object of the invention is to provide a non-skid tire tread combining the road gripping features of a cup-type tread with the road gripping features of a tire tread having a wire coil embedded therein.

A further object of the invention is to provide a non-skid tire tread of the class described having a substantially smooth road contacting surface and having coils of wire embedded therein in wavy longitudinal lines, thereby providing substantially uniform road gripping action over the entire width of the tire tread.

A further object of the invention is to provide a non-skid tire tread of the class described wherein each of the cups or recesses formed in the tread surface thereof exposes a side portion of at least one of the wire coils imbedded in said tread, thereby providing means for the dissipation of heat from the interior of the tread through said coils and out of said cups or recesses.

A further object of the invention is to provide a non-skid tire of the class described which may be made either with or without transverse ventilating passages communicating with the inner ends of cup-shaped recesses.

With the above and other objects in view, the invention consists of the improved non-skid tire tread, and all of its parts and combinations, as set forth in the claims, and all equivalents thereof.

In the drawing accompanying and forming a part of this specification, wherein are shown two embodiments of the invention, and wherein like reference characters indicate the same parts in all of the views.

Figure 1:
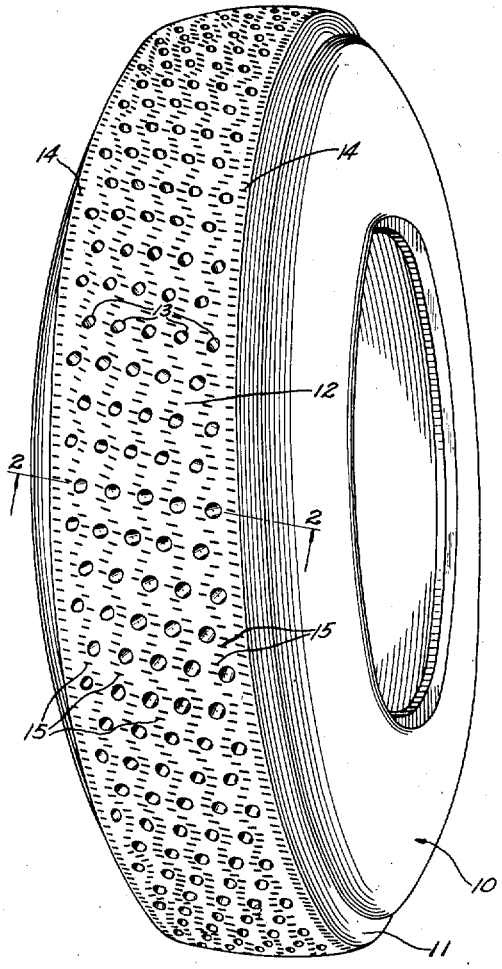
Fig. 1 is a perspective view of a tire embodying the preferred form of tread construction.

Referring more particularly to the drawing, the numeral 10 indicates a tire having a tread 11 constructed in accordance with the invention. The tread 11 is preferably of a height substantially the same as that of conventional rider strip tires, and may have a smooth road contacting surface 12.

Formed in the tread surface 12 is a plurality of recesses 13 which may be cup-shaped or any other suitable shape. The recesses 13 are preferably arranged in transversely extending oblique rows as indicated by the line 2—2 of Fig. 1. There are preferably five recesses to each row and the recesses of adjacent rows are preferably laterally staggered as shown in Fig. 1. The rows of recesses 13 are preferably substantially parallel.

Imbedded in the tread 11 with a side portion thereof flush with surface 12 and extending longitudinally in a substantially straight line adjacent each edge of the tread 12 are wire coils 14. Also imbedded in the tread 11 with a side portion thereof flush with the surface 12 are a plurality of wire coils 15 which extend longitudinally of the tread 11 in a wavy conformation. The number of the coils 15 is preferably the same as the number of recesses 13 in each row—in this case five. It will be noted from Fig. 1 that the coils 15 are threaded in a laterally waved longitudinal path around opposite sides of corresponding recesses of adjacent rows. For example, in Fig. 1, the extreme left hand coil 15 is imbedded in a manner to pass on the left side of the extreme left hand recess of one transverse row and on the right side of the extreme left hand recess of the next adjacent row. The lateral staggering of adjacent rows permits this to be done without too great deformation of the coils 15 out of a straight longitudinal line.

Figure 2:
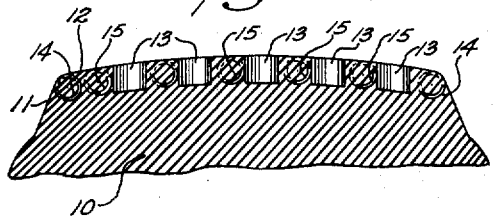
Fig. 2 is a transverse vertical sectional view, on an enlarged scale, taken along the line 2—2 of Fig. 1.

As each of the coils 15 passes the recess with which it cooperates, a side portion of said coil becomes flush with the side wall of the recess and thereby becomes exposed in the same manner as the coils are exposed on the surface 12. Fig. 2 shows each of the coils 15 as being flush with the side wall of one of the recesses 13; as well as being flush with the surface 12.

By having the recesses 13 equally spaced in their rows, and by having said rows parallel and uniformly laterally staggered, the coils 15 are thereby substantially equally spaced and are substantially parallel even though curved. The wavy conformation of the coils 15 gives a much wider area in which the coils operate in augmenting the traction of the tire by penetration into the roadbed. In the type of tire having a wire coil imbedded in each rider strip thereof, the tractive effort of the coils is limited to one straight path for each coil, said path having a width substantially equal to that of the coil. In the improved tire, the wavy conformation of the coils 15 makes possible substantially uniformly effective tractive effort over the entire width of the tread surface 12, and there is no restriction of the tractive effort to a few relatively narrow paths.

Since metal is a relatively good conductor of heat and since rubber is not, the wire coils imbedded in the improved tire conduct heat from the interior of the tread 11 to the surface 12 where it is dissipated. In addition to the heat dissipated by the coils at the surface 12, the construction of the improved tire provides for dissipation of heat by the coils at the sidewalls of the recesses where portions of the coils are exposed. This provides for a greatly increased rate of cooling and thereby enables the tire to be run at lower temperatures than conventional tires.

Figure 3:
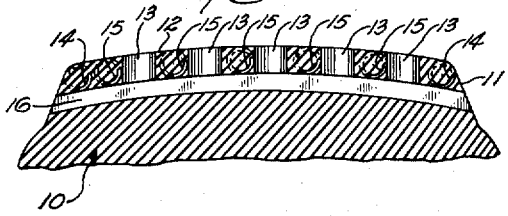
Fig. 3 is a transverse vertical sectional view similar to that of Fig. 2 taken through a modified form of the invention.

The improved tread construction may embody transverse ventillating passages 16, as shown in Fig. 3. This construction is in accordance with the disclosure in my copending application Serial No. 46,909, *now Patent No. 2,540,043, January 30, 1951*. In this construction the inner ends of the recesses 13 communicate with the transverse passages 16 which underlie the surface 12 and which underlie the coils 14 and 15 and which are alined with the rows of recesses 13. This construction not only has the added advantages which are inherent in the construction of the above-mentioned application, but also provides for additional dissipation of heat from the coils 14 and 15 through the passages 16, since said coils have a side portion exposed at each of the passages 16.

While cup-shaped recesses 13 are shown in the preferred embodiment, any desired shape of recess may be used. It is also within the concept of this invention to provide a tire having coils imbedded therein as shown but without recesses in the tread surface 13 thereof. The improved non-skid tread may obviously be employed in applications other than the vehicle tires.

Various other changes and modifications may be made without departing from the spirit of the invention, and all of such changes are contemplated as may come within the scope of the claims.

I claim:

1. In a traction member having a rubber tread portion with a plurality of recesses formed in the surface thereof, at least two-spaced metal coils extending longitudinally within said tread portion in a transversely waved conformation between said recesses, adjacent coils being positioned with a plurality of said recesses therebetween, and one side portion of each of said coils being substantially flush with the tread surface.

2. In a tire having a rubber tread portion with a plurality of recesses formed in the wearing surface thereof, said recesses being arranged in transversely extending rows, a plurality of spaced substantially parallel metal coils extending longitudinally within said tread portion in a transversely waved conformation around and between said recesses, adjacent coils being positioned with a plurality of said recesses therebetween, one side portion of each of said coils being substantially flush with said wearing surface and each of said recesses having a side portion of a coil flush with a sidewall portion thereof.

3. In a tire having a rubber tread portion with a plurality of recesses formed in the wearing surface thereof, said recesses being arranged with an equal number thereof in each of a plurality of transversely extending rows, the recesses of adjacent rows being laterally staggered, a plurality of spaced substantially parallel metal coils extending longitudinally within said tread portion in a transversely waved conformation around and between said recesses, adjacent coils being positioned with a plurality of said recesses therebetween, one side of each of said coils being substantially flush with said wearing surface, and each of said recesses having a side portion of a coil flush with a sidewall portion thereof.

4. In a tire having a rubber tread portion with a plurality of recesses formed in the wearing surface thereof, said recesses being arranged with an equal number thereof in each of a plurality of transversely extending rows, the recesses of adjacent rows being transversely staggered, a plurality of spaced metal coils extending longitudinally within said tread portion in a transversely waved conformation around and between said recesses, adjacent coils being positioned with a plurality of said recesses therebetween; there being the same number of said coils as there are recesses in each of the rows, a side portion of each of said coils being substantially flush with said wearing surface, and each of said coils having side portions flush with opposite sidewall portions of corresponding recesses of adjacent rows.

5. In a tire having a rubber tread portion with a plurality of recesses formed in the wearing surface thereof, said recesses being arranged with an equal number thereof in each of a plurality of substantially parallel, transversely extending oblique rows, the recesses of adjacent rows being transversely staggered, a plurality of spaced metal coils extending longitudinally within said tread portion in a transversely waved conformation, around and between said recesses, adjacent coils being positioned with a plurality of said recesses therebetween, there being the same number of said coils as there are recesses in each of the rows, a side portion of each of said coils being substantially flush with said wearing surface, and each of said coils having side portions flush with opposite sidewall portions of corresponding recesses of adjacent rows.

6. In a tire having a rubber tread portion with a plurality of recesses formed in the wearing surface thereof, said recesses being arranged with an equal number thereof in each of a plurality of substantially parallel transversely extending oblique rows, the recesses of adjacent rows being transversely staggered, a metal coil extending longitudinally within said tread portion adjacent each edge thereof and having a side portion thereof flush with said wearing surface and a plurality of metal coils extending longitudinally within said tread portion in a transversely waved conformation around and between said recesses, adjacent coils being positioned with a plurality of said recesses therebetween, there being the same number of said waved coils as there are recesses in each of the rows, a side portion of each of said waved coils being substantially flush with said wearing surface, and each of said waved coils having side portions flush with opposite sidewalls portions of corresponding recesses of adjacent rows.

7. *In a tire having a rubber tread portion with a plurality of recesses formed in the surface thereof, at least two spaced metal coils extending circumferentially around the tire within the tread portion with said coils having their longitudinal axes transversely waved in serpentine fashion between said recesses whereby there is provided a contact of coil portions with the road surface over substantially that entire area of the tire tread which is included between said coils, adjacent coils being positioned with a recessed portion of the tire therebetween which recessed portion extends around the tire, and one side portion of each of said coils being substantially flush with the tread surface.*

DAVID E. CROOKER.

References Cited in the file of this patent or the original patent

UNITED STATES PATENTS

| Number | Name | Date |
|---|---|---|
| 627,483 | Comly | June 27, 1899 |
| 1,159,244 | Midgley | Nov. 2, 1915 |
| 2,006,038 | Yamaki | June 25, 1935 |
| 2,234,823 | Hewel | Mar. 11, 1941 |
| 2,239,070 | Work et al. | Apr. 22, 1941 |
| 2,526,746 | Hawkinson | Oct. 24, 1950 |